United States Patent [19]

Teletzke et al.

[11] Patent Number: 4,828,032
[45] Date of Patent: May 9, 1989

[54] OIL RECOVERY PROCESS USING ALKYL HYDROXYAROMATIC DIANIONIC SURFACTANTS AS MOBILITY CONTROL AGENTS

[75] Inventors: Gary F. Teletzke, Sugarland; Thomas L. Ashcraft, Jr., Baytown; Ronald L. Reed, Houston, all of Tex.

[73] Assignee: Exxon Production Research Company, Houston, Tex.

[21] Appl. No.: 282,923

[22] Filed: Dec. 7, 1988

Related U.S. Application Data

[63] Continuation-in-part of Ser. No. 109,385, Oct. 15, 1987, abandoned.

[51] Int. Cl.⁴ .................. E21B 43/22; E21B 43/24
[52] U.S. Cl. .................. 166/272; 166/273; 166/274; 166/303; 166/305.1; 166/309; 252/8.554
[58] Field of Search .................. 166/268, 269, 272–275, 166/303, 305.1, 312, 309; 252/8.554

[56] References Cited

U.S. PATENT DOCUMENTS

| | | | |
|---|---|---|---|
| 3,240,280 | 3/1966 | Stratton et al. | 166/309 X |
| 3,393,221 | 7/1968 | Boehmke et al. | 260/465 |
| 3,951,823 | 4/1976 | Straus et al. | 166/309 X |
| 3,981,361 | 9/1976 | Healy | 166/252 |
| 4,013,569 | 3/1977 | Chiu et al. | 252/8.554 |
| 4,138,345 | 2/1979 | Williams | 252/8.554 |
| 4,293,428 | 10/1981 | Gale et al. | 252/8.554 |
| 4,357,281 | 11/1982 | Hinkamp | 252/8.554 X |
| 4,393,937 | 7/1983 | Dilgren et al. | 252/8.554 X |
| 4,454,074 | 6/1984 | Naylor | 252/8.554 X |
| 4,502,538 | 3/1985 | Wellington et al. | 166/252 |
| 4,537,253 | 8/1985 | Morita et al. | 252/8.554 X |
| 4,577,688 | 3/1986 | Gassman et al. | 166/245 |
| 4,609,044 | 9/1986 | Lau | 166/270 |
| 4,643,253 | 2/1987 | Shepherd et al. | 166/274 |
| 4,643,256 | 2/1987 | Dilgren et al. | 166/303 |
| 4,682,653 | 7/1987 | Angstadt | 252/8.554 X |
| 4,699,214 | 10/1987 | Angstadt | 252/8.554 X |

FOREIGN PATENT DOCUMENTS

| | | | |
|---|---|---|---|
| 62490 | 10/1982 | European Pat. Off. | 252/8.554 |
| 85/05146 | 11/1985 | PCT Int'l Appl. | 166/272 |

Primary Examiner—George A. Suchfield
Attorney, Agent, or Firm—Gary L. Lawson; Pamela L. Wilson

[57] ABSTRACT

A method for recovering oil from a subterranean formation is disclosed wherein an aqueous surfactant solution is injected into the formation to reduce the mobility of gas in a gas-flooding process. The gas may include hydrocarbon gas, inert gas, carbon dioxide, and steam. The surfactant is represented by the general formula

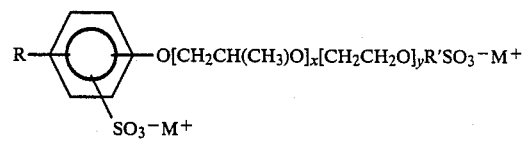

where
R is a linear or branched chain alkyl group with n carbon atoms wherein n ranges from 0 to about 18, except that if the gas is steam n ranges from about 9 to about 30;
x ranges from 0 to about 20 and y ranges from 0 to about 20, provided x+y does not exceed about 20;
R' is a linear or branched chain alkyl group with m carbon atoms wherein m ranges from 0 to 4, except that if the gas is steam m ranges from 1 to 4, with the proviso that the sum of x+y+m is at least one; and each M+ is a cation.

21 Claims, 1 Drawing Sheet

OIL RECOVERY PROCESS USING ALKYL HYDROXYAROMATIC DIANIONIC SURFACTANTS AS MOBILITY CONTROL AGENTS

This application is a continuation-in-part application of co-pending application Ser. No. 109,385, filed on Oct. 15, 1987 now abandoned.

FIELD OF THE INVENTION

This invention relates to recovering oil from a subterranean oil-bearing formation by injecting into the formation a gas and an aqueous surfactant solution to control gas mobility. More specifically, the invention pertains to use of alkyl hydroxyaromatic dianionic surfactants to reduce gas mobility within an oil-bearing formation.

BACKGROUND OF THE INVENTION

A significant fraction of the oil-in-place is left in the ground after primary or secondary recovery. Gas injection, sometimes referred to as gas flooding, has been used to recover this remaining oil. The terms "gas injection" and "gas flooding" as used herein will mean an oil recovery process in which the fluid injected is a hydrocarbon gas, inert gas, carbon dioxide, or steam.

The success of gas floods has been diminished by the unfavorable mobility ratio between the gas and oil. The viscosities of gas mixtures are often 10 to 100 times lower than oil and water viscosities. At these unfavorable viscosity ratios, gases finger and channel through the formation, leaving parts of the reservoir unswept. Added to this fingering is the inherent tendency of a highly mobile gas to flow preferentially through the more permeable rock sections or to gravity override in the reservoir. These basic factors—permeability variations and unfavorable mobility and density ratios—greatly reduce the effectiveness of gas floods and may make them uneconomic. One apparent remedy is to control the mobility of the injected gas.

It has been suggested that the mobility of the gas may be reduced by injecting into a formation or forming in situ a mixture of a gas and an aqueous surfactant solution. Such mixtures are commonly referred to as foams. Since the effective viscosity of foam is greater than the viscosity of its components, it has been suggested that such mixtures of gas and aqueous surfactant solution will help improve the sweep efficiency of gas drives.

Foam is a dispersion of a large volume of gas in a relatively small volume of liquid. It should be noted, however, that at reservoir conditions several gases, including $CO_2$, exist as a dense fluid, resembling a liquid more than a gas. For this reason, the term "solvent" is sometimes used to describe the "gas" and the term "emulsion" is sometimes used to describe the solvent-water mixture.

Mobility control may be accomplished by injecting a bank of aqueous surfactant solution followed by injecting gas. Alternatively, banks of surfactant solution can be interspersed with the gas during injection to achieve a more continuous effect.

It is known that the choice of surfactant for use as a mobility control agent is of vital importance. Many surfactants cause too severe a reduction of gas mobility, thus making the gas difficult to inject into the reservoir. Other surfactants cause an insufficient reduction of gas mobility, thus leading to inadequate improvement of sweep efficiency.

Conditions existing in a typical oil reservoir impose a severe challenge to surfactant performance. Most reservoirs have an aqueous phase of brine that may vary in concentration from 0.5% to 15% NaCl. Also, there may be divalent ions such as $Ca^{++}$ and $Mg^{++}$ present in significant concentrations (100 ppm or more). Adsorption or trapping of surfactant in viscous emulsions is another limitation. The effect of crude oil and temperature can also be deleterious if not properly taken into consideration.

Considerable effort has been made by the petroleum industry to identify surfactants with proper chemical stability, adsorption characteristics, and capability for gas-mobility reduction. Hundreds of surfactants have been screened. There continues to be a significant need, however, for improved gas mobility-control processes in which the amount of additional oil recovered as a result of injecting the surfactant and gas is sufficient to justify the cost of the process.

SUMMARY OF THE INVENTION

The present invention relates to an improved process for reducing gas mobility in a region of a subterranean, oil-containing formation by introducing into the formation a gas and an aqueous solution containing a surfactant characterized by the formula

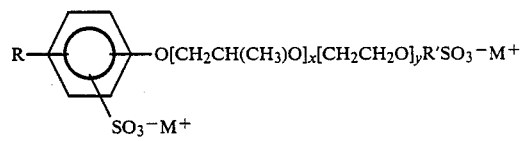

where
R is a linear or branched chain alkyl group with n carbon atoms wherein n ranges from 0 to about 18, except that if the gas is steam n ranges from about 9 to about 30;
x ranges from 0 to about 20 and y ranges from 0 to about 20, provided $x+y$ does not exceed about 20;
R' is a linear or branched chain alkyl group with m carbon atoms wherein m ranges from 0 to 4, except that if the gas is steam m ranges from 1 to 4, with the proviso that the sum of $x+y+m$ is at least one; and
each $M^+$ is a cation.

In a preferred embodiment for reducing the mobility of carbon dioxide, hydrocarbon gas, or inert gas, the aqueous solution contains 0.02 to 1.0% by weight $C_{6-30}$ phenol disulfonate containing 0–6 ethoxy groups terminated by an ethyl or a propyl sulfonate group. A preferred surfactant for a steam flood is $C_{12-30}$ phenol disulfonate containing 0–6 ethoxy groups terminated by an ethyl or propyl sulfonate group.

The gas mobility is reduced in situ in the formation by injecting the aqueous surfactant solution into the formation through an injection well and injecting gas into the formation through the injection well with or after injection of the aqueous surfactant solution. In another embodiment the formation is first flooded with gas before injecting the mobility control agent. The steps of injecting aqueous surfactant solution and gas may be repeated.

The practice of this invention provides effective mobility control for gas floods and improves oil displacement efficiency.

DETAILED DESCRIPTION OF THE INVENTION

Figure 1:
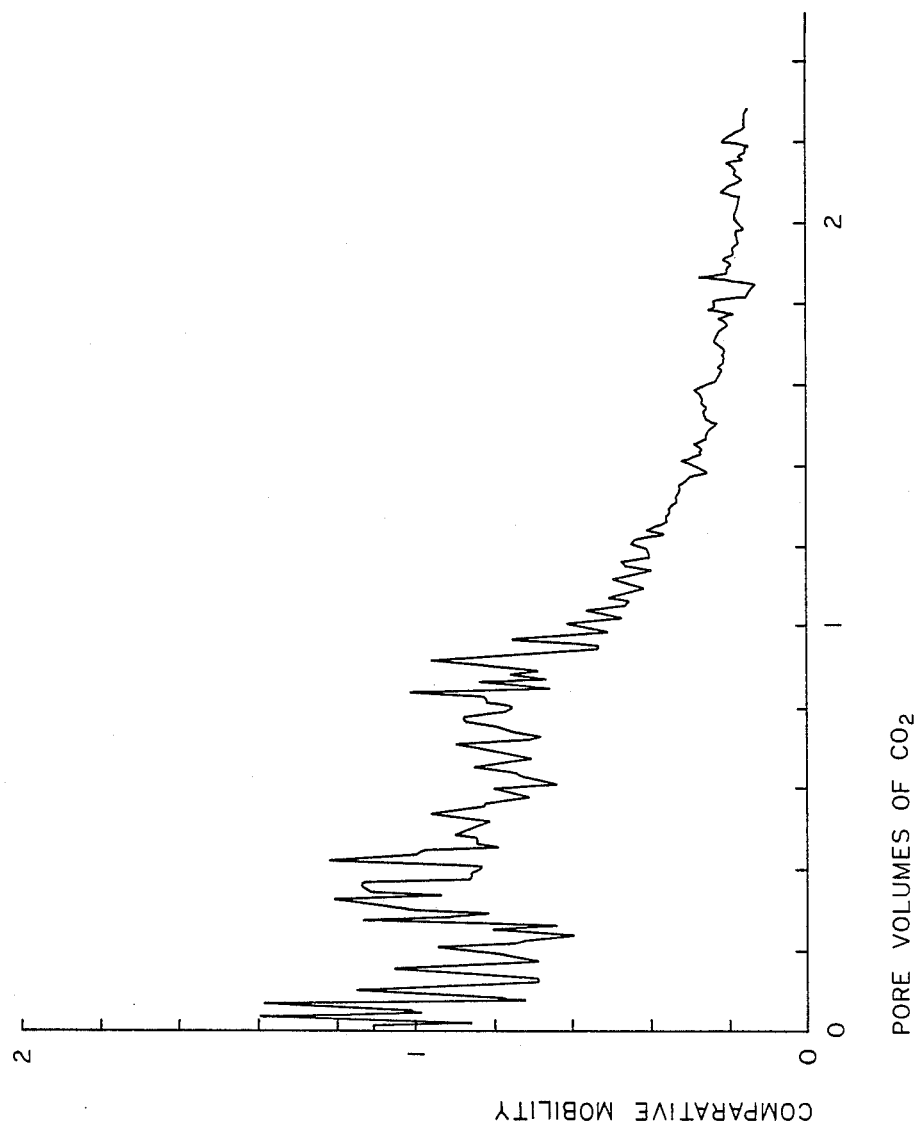
FIG. 1, which illustrates the result of an experimental core displacement test, plots comparative mobility of a mixture of $CO_2$ and aqueous surfactant solution generated in accordance with this invention as a function of pore volumes of $CO_2$ injected.

A mobility control system comprising a mixture of gas and an aqueous solution containing a surfactant for use as a mobility control fluid in recovering oil from a subterranean oil-bearing formation should ideally have the following characteristics:

The mixture should provide resistance to flow of the gas in gas-swept zones where the oil saturation is low.

The mixture should not impair the mobility of gas and oil in unswept zones where oil saturation is high.

The surfactant retention should be low and the surfactant should be effective at low concentrations.

The properties of the mixture should be insensitive to reasonable variations in reservoir salinity, temperature, and surfactant concentration.

The present invention is premised on the discovery that a mobility control system exhibiting the beneficial characteristics listed above can be formed by use of a surfactant characterized by the formula

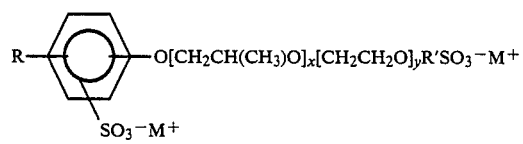

(1)

where
R is a linear or branched chain alkyl group with n carbon atoms wherein n ranges from 0 to about 18, except that if the gas is steam n ranges from about 9 to about 30;

x ranges from 0 to about 20 and y ranges from 0 to about 20, provided x+y does not exceed about 20;

R' is a linear or branched chain alkyl group with m carbon atoms wherein m ranges from 0 to 4, except that if the gas is steam m ranges from 1 to 4, with the proviso that the sum of x+y+m is at least one; and each $M^+$ is a cation.

The ethoxy and propoxy groups may be present as a block co-polymer chain or they may be intermixed within the alkoxy chain.

M can include alkali metals such as sodium, potassium and lithium, alkaline earth metals such as calcium and barium, amines including alkanol amines and their oxyalkylated adducts, and ammonium.

It should be understood the polyalkoxy surfactants used in the present invention will not normally be pure substances in the strict sense, but a mixture of components such that x and y are the resulting average values. It should also be understood that in the preparation of the surfactants used in the present invention, the surfactant formulation may contain compounds falling outside formula (1). For example, the formulation may include small amounts of compounds containing more than one alkyl group or more than one sulfonate group attached to the benzene ring. The formulation may also include small amounts of monosulfonate in which either sulfonate group in formula (1) is absent.

Non-limiting examples of surfactants characterized by formula (1) suitable for reducing the mobility of carbon dioxide, hydrocarbon gas and inert gas are listed in Table 1:

TABLE 1

| R | R' | x | y | $M^+$ |
|---|---|---|---|---|
| linear $C_{16}H_{33}$ | $CH_2CH_2CH_2$ | 0 | 0 | $Na^+$ |
| branched $C_9H_{19}$ | $CH_2CH_2$ | 0 | 2 | $Na^+$ |
| linear $C_{16}H_{33}$ | $CH(CH_3)CH_2CH_2$ | 0 | 0 | $Na^+$ |
| branched $C_9H_{19}$ | none | 0 | 3 | $Na^+$ |
| branched $C_9H_{19}$ | $CH_2CH_2$ | 1 | 3 | $Na^+$ |
| branched $C_9H_{19}$ | $CH_2CH_2$ | 3 | 0 | $Na^+$ |
| branched $C_9H_{19}$ | $CH_2CH_2$ | 0 | 2 | $NH_4^+$ |

Non-limiting examples of surfactants characterized by formula (1) suitable for reducing the mobility of steam are listed in Table 2.

TABLE 2

| R | R' | x | y | $M^+$ |
|---|---|---|---|---|
| linear $C_{18}H_{37}$ | $CH_2CH_2CH_2$ | 0 | 0 | $Na^+$ |
| branched $C_{12}H_{23}$ | $CH_2CH_2$ | 0 | 2 | $Na^+$ |
| linear $C_{18}H_{37}$ | $CH(CH_3)CH_2CH_2$ | 0 | 0 | $Na^+$ |
| linear $C_{18}H_{37}$ | $CH_2CH_2$ | 1 | 3 | $Na^+$ |
| linear $C_{18}H_{37}$ | $CH_2CH_2$ | 3 | 0 | $Na^+$ |
| linear $C_{18}H_{37}$ | $CH_2CH_2$ | 0 | 2 | $NH_4^+$ |

In selecting mobility control surfactants of this invention for a particular flooding operation, the effects of gas composition should be considered. A mobility control system comprising a surfactant represented by formula (1) above and steam will generally have higher mobility than a mobility control system comprising the same surfactant and other gases such as $CO_2$ and $N_2$. Since the mobility of gas in this invention tends to decrease as the number of carbon atoms of the lipophile portion of the surfactant increases, the number of carbon atoms in R in formula (1) is generally higher for use in steam floods than the number of carbon atoms of R for use in other gas floods.

Referring again to formula (1), when m=0, the R' alkyl group is absent, and the surfactant contains a sulfate group. It is well known to those skilled in the art that sulfate surfactants are susceptible to rapid chemical degradation by hydrolysis of the sulfate group at high temperature and/or low pH. The product of the degradation reaction tends to be less effective as a mobility-reducing agent, and may have significantly higher retention than the original surfactant. For this reason, surfactants having m=0 would generally not be used in flooding processes where the temperature is high, such as steam flooding, or where pH is low, such as $CO_2$ flooding. Surfactants having m=0 may, however, be used under conditions where the rate of hydrolysis of the sulfate group is low. Examples of such conditions may include hydrocarbon or inert gas flooding at low temperature, or $CO_2$ flooding at low temperature in a reservoir where pH is buffered by reservoir minerals to a level at which hydrolysis is acceptably slow.

Particularly preferred mobility control systems of this invention include surfactants having a composition characterized by the formula:

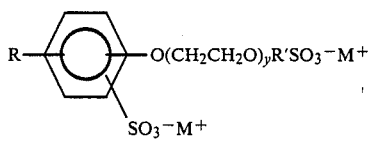

ps where:

R is a $C_6$ to $C_{18}$ linear or branched alkyl chain for use in $CO_2$, inert gas, and hydrocarbon gas floods, and R is a linear or branched $C_{12}$ to $C_{30}$ alkyl chain for use in steam floods; y is 0 to 6; R' is an alkyl group containing two or three carbons; and each $M^+$ is an alkali metal ion.

As understood by those skilled in the art, the optimum surfactant for a particular gas flooding process will depend on the reservoir in which it is used. The optimum values of n, m, x, and y in formula (1) for a particular gas flooding operation will depend on the reservoir conditions of temperature, pressure, permeability, salinity, oil composition, and the like. The optimum surfactant may be determined by performing core displacement tests using procedures known to those skilled in the art. Such tests may be used to select a surfactant that has low retention, can be used at low concentration, provides a substantial but not excessive reduction of gas mobility, and does not impair the recovery of the oil.

The surfactants of the present invention may be prepared by known procedures. The following is a description of one way of preparing such surfactants. For those surfactants having two or more carbon atoms attached to the benzene ring, the synthesis procedure usually begins by reacting phenol with olefins at temperatures and pressures sufficient to alkylate the phenol. The reaction is conducted in the presence of an effective amount of an acid catalyst such as boron triflouride, sulfuric acid, phosphoric acid, or sulfonic acid. The alkyl phenols may then be reacted with alkylene oxides in the presence of a base to provide alkyl-phenyl polyalkoxy alcohols. The alkoxy derivatives may then be reacted with a sultone such as propane sultone or butane sultone to form an alkyl phenol alkoxy monosulfonate. A sulfonate group may be added on the aromatic ring to produce a disulfonate by sulfonating the alkyl phenol alkoxy monosulfonate product with a suitable sulfonating agent such as chlorosulfonic acid. The disulfonic acid may then be neutralized with a base such as 50% NaOH.

In a preferred way of preparing a surfactant that falls within the class of surfactants of the present invention, a process is used which produces a commercially viable quantity of monosulfonated alkylphenol polyalkylene oxide sulfonate (APDS). The disulfonate has the general formula:

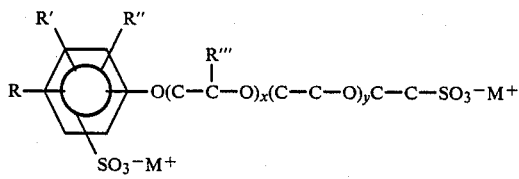

where

R is a linear or branched alkyl group having from 3 to about 40 carbon atoms;

R', R" and R''' are independently H or $C_{1-3}$ alkyl groups;

x ranges from 0 to about 10;

y ranges from 0 to about 50; and each $M^+$ is a suitable cation comprising ammonia, amines, ethanolamines and metal mono- or di-cations.

The dianion will have one sulfonate group attached to the terminus of the dianion's oxyalkylate chain, and the other sulfonate group directly attached to the dianion's phenyl ring.

The first step of the process is the conventional alkylation of a phenol with a linear or branched olefin to form a linear or branched alkylphenol. This reaction may be characterized as follows:

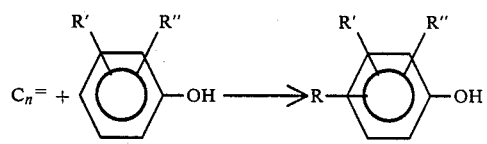

where n is the number of carbon atoms and R,

R' and R" are the same as defined above.

The chain length of the olefin will be chosen to optimize the properties of the target surfactant for the anticipated application. This reaction typically takes place in the presence of a catalyst such as boron trifluoride etherate. The mole ratio of phenol to olefin is preferably 1:1 to 10:1 and more preferably 2:1 to 6:1. The reaction will proceed at temperatures of 0° C. to 200° C., with a preferred range of 60° C. to 150° C. Suitable alkylphenols are also commercially available from a variety of manufacturers.

The alkylphenol is then conventionally oxyalkylated with one or more low molecular weight alkylene oxides. Suitable alkylene oxides include ethylene oxide, propylene oxide and butylene oxide. However, any alkylene oxide adducted to the end of the oxyalkylate chain must have a primary alcohol functionality. For this reason, ethylene oxide is the preferred alkylene oxide for use in this reaction. The mole ratio of total alkylene oxide to alkylphenol should be 1:1 to 100:1, and more preferably 1.1:1 to 30:1. The reaction temperature should be 100° C. to 200° C., with a preferred temperature of between 125 C. and 150° C. A small amount of catalyst such as a potassium cation is preferably present during the reaction.

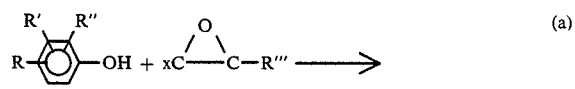

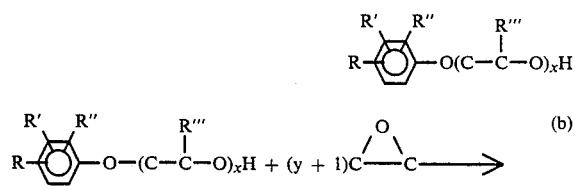

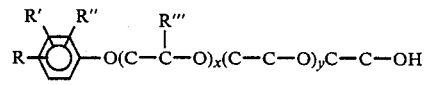

The oxyalkylated alkylphenol is then sulfonated using a suitable sulfonating agent such as chlorosulfonic acid, SO$_3$, or oleum.

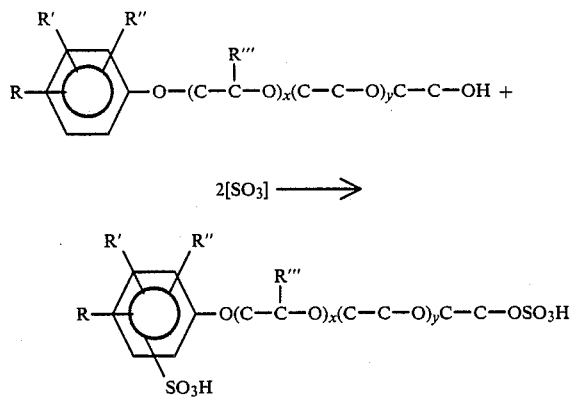

where
R is a linear or branched alkyl group having from 3 to about 40 carbon atoms;
R', R" and R'" are independently H or C$_{1-3}$ alkyl groups;
x ranges from 0 to about 10; and
y ranges from 0 to about 50.

In order for the process to be commercially feasible, yields of the dianion preferably exceed about 80–85 mole % based on the starting alkylphenol.

High yields of sulfate/sulfonate diacid can be obtained by reacting the oxyalkylated alkylphenol with chlorosulfonic acid. The mole ratio of chlorosulfonic to oxyalkylated alkylphenol is preferably 1.9:1 to 3:1, and more preferably 2:1 to 2.5:1. The reaction, which is strongly exothermic, may be carried out at temperatures of $-20°$ C. to $75°$ C., and preferably $0°$ C. to $40°$ C.

Sulfonation may also be accomplished by reacting the oxyalkylated alkylphenol with gaseous sulfur trioxide (SO$_3$). While yields of sulfate/sulfonate diacid are generally not as high as with chlorosulfonic acid, the use of SO$_3$ requires less investment and has lower operating costs. The mole ratio of gaseous SO$_3$ to oxyalkylated alkylphenol is preferably 1.9:1 to 2.5:1, and more preferably 2.0:1 to 2.2:1. The reaction temperature should be $30°$ C. to $120°$ C., with a preferred range of $50°$ C. to $90°$ C.

The diacid is then conventionally neutralized with any standard base, such as sodium hydroxide, potassium hydroxide, a sodium sulfite, a sodium carbonate, ammonia, or an ethanol amine to form a neutral dianion salt. The base is selected on the basis of cost, availability and performance.

The final step is the replacement of the sulfate from the terminus of the dianion's oxyalkylate chain with a sulfonate. The neutralized dianion is reacted with an aqueous sulfite solution (e.g. sodium sulfite). The ratio of sulfite to dianion should be in the range of 1:1 to 10:1 moles per mole and more preferably in the range of 2:1 to 6:1. The reaction temperature may be $100°$ C. to $250°$ C., with a preferred temperature of $120°$ C. to $200°$ C. The final product, a monosulfonated alkylphenol polyalkylene oxide sulfonate (APDS), is formed in this reaction. The disulfonate has the general formula:

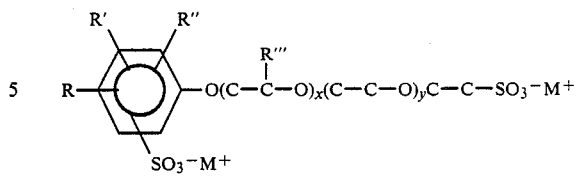

where
R is a linear or branched alkyl group having from 3 to about 40 carbon atoms;
R', R", R'" are independently H or C$_{1-3}$ alkyl groups;
x ranges from 0 to about 10;
y ranges from 0 to about 50; and
each M$^+$ is a suitable cation comprising ammonia, amines, ethanolamines and metal mono- or di-cations.

The disulfonate is then separated from the aqueous solution containing both inorganic salts and unreacted sulfite by extraction with butanol or other low molecular weight oxygenated organic solvents. The ability to effectively concentrate the disulfonate is advantageous in reducing costs for transporting the disulfonate products. In addition, the unreacted sulfite can be recycled for use in subsequent displacement reactions. The organic solvent can also be recycled and reused in the extraction step.

The present invention is useful where it is desirable to reduce gas mobility in an area of a subterranean, oil-containing formation to facilitate production of oil from or displacement of oil through the pores of the formation. The formation may be any light or heavy oil reservoir having a permeability suitable for an application of a fluid to displace oil away from a well borehole in a well-cleaning operation or to displace oil through the formation to a producing location in an oil recovery operation.

In general, the gaseous fluids can comprise steam, carbon dioxide, inert gases such as air and nitrogen, hydrocarbons such as methane, ethane, propane, and natural gas, and mixtures thereof.

Gas and aqueous surfactant solutions may be injected into the formation in the form of alternating banks. The gas and aqueous surfactant solution will mix in the formation. However, where desirable, the gas and aqueous solution may be injected simultaneously, as a dispersion of the gas in the liquid or as a pair of co-flowing streams of the two fluids within a common conduit. The components are preferably injected at a pressure sufficient to displace the oil without fracturing the reservoir. However, in low permeability reservoirs controlled fractures of limited extent may be required to obtain adequate injectivity.

In the practice of one embodiment of this invention, CO$_2$ is injected into an oil-bearing subterranean formation through an injection well. The highly mobile gas will tend to flow preferentially through the more permeable rock sections. The CO$_2$ mobilizes the recoverable oil in those sections. Gas injection continues until sufficient gas has been injected to ensure recovery of a substantial portion of the oil in the more permeable zones, or until gas breakthrough occurs at the production well which is spaced apart from the injection well. A bank of brine containing a surfactant characterized by formula (1) above is then injected, followed by a second bank of CO$_2$. The surfactant solution will preferentially enter the more permeable zones and will reduce gas mobility in those areas, thus diverting $CO_2$ to previously unswept zones of the formation. Banks of surfactant solution may be alternated with banks of $CO_2$. Optionally, the composition of surfactant in the aqueous solution may be varied from one bank to the next to optimize the process. If desired, a bank of drive fluid may be injected after the last $CO_2$ bank has been injected to displace the $CO_2$ through the formation.

In another embodiment of this invention, a small amount of surfactant characterized by formula (1) above is added to water during the last stage of a waterflood operation. Surfactant is injected before start-up of a gas injection project to avoid time delays associated with injecting an additional surfactant bank after the usual waterflood operation has been completed.

The process of this invention may be applied to a subterranean, oil-containing formation penetrated by at least one injection well and at least one spaced-apart production well. The injection well is perforated or other fluid flow communication is established between the well and the formation. The production well is completed in fluid communication with a substantial portion of the vertical thickness of the formation. While recovery of the type contemplated by this invention may be carried out with only two wells, this invention is not limited to any particular number of wells. The invention may be practiced using a variety of well patterns as is well known in the art of oil recovery, such as a repeated five-spot pattern in which each injection well is surrounded with four production wells, or in a line-drive arrangment in which a series of aligned injection wells and a series of aligned production wells are utilized.

This process can also be used in "huff and puff" operations through a single well. In the huff and puff procedure, the reduced gas mobility is generated through the same well that is subsequently used for production. The reduced gas mobility improves the injection profile. The gas mobility is swept zones is greatly reduced so the gas will invade the previously unswept tighter zones. The well may be shut in for a period of time before placing it on the production cycle. After the production cycle, additional cycles of injection and production can be utilized.

The aqueous surfactant solution used in this invention may be prepared from brine or carbonated water. Preferably the water available at the injection well site, often formation brine, will be used to prepare the aqueous surfactant solution.

The concentration of surfactant in the aqueous solution will ordinarily range from about 0.01 to 2% by weight and preferably from about 0.05 to 1%, and still more preferably from 0.05 to 0.5%.

As known to those skilled in the art, the volumes required for the banks of aqueous solution and gas are different for different reservoirs, but it can be estimated by known procedures with reasonable accuracy. Generally, the total pore volume of surfactant solution used in this invention will range from 0.01 to 1 and preferably from 0.1 to 0.5 pore volume.

$CO_2$ used in this invention can be obtained from any available source. It is not necessary that it be pure. The $CO_2$ that is produced through the production wells can be separated therefrom and reinjected into the formation. Recycling methods for $CO_2$ are generally known and do not need further explanation.

Steam used in the present invention can be generated as a dry, superheated, or wet steam and subsequently mixed with aqueous liquid. The steam can be generated at surface or downhole locations and mixed with the aqueous surfactant solution at surface or downhole locations. Optionally, the steam may include a gas that is noncondensable at reservoir temperature and pressure.

p Experimental Results

This invention is futher illustrated by the following laboratory experiments, which demonstrate the operability of the invention. The experiments are not intended as limiting the scope of the invention as defined in the appended claims.

All of the core flooding laboratory experiments described below used 1 in.×1 in.×12 in. (2.54cm×2.54cm×30.5cm) Berea sandstone cores. Differential pressures were monitored between inlet and outlet and between three pairs of taps 1 in. (2.54 cm) apart located 2 in. (5.04 cm), 6 in. (15.24 cm) and 10 in. (25.40 cm) from the inlet. All experiments were carried out at 2000 psi (13,789 kPa) with decane as the oil phase. Two high-salinity brines were used: 3.5% and 7.0% by weight total dissolved solids (TDS). Both brines has high contents of divalent ions, with a weight-ratio of $CaCl_2$ to NaCl of 1 to 4. Two temperatures were used: 100° F. (37.8° C.) and 150° F.65.6° C. ). Five core cores were flooded with oil (decane) to connate water saturation and then waterflooded with brine at a rate of 3 ft/day (0.91 m/day) prior to carrying out the experiments. Decane was completely miscible with $CO_2$ at the conditions of the tests. The injection rate of $CO_2$ through the cores was 1 ft/day (0.30 m/day) and the injection rate of surfactant solution was 3 ft/day (0.91 m/day). At this rate, no oil was produced when only surfactant solution flowed through the cores.

Table 3 below sets forth core permeability, brine concentration, temperature, and injection sequence for each run.

TABLE 3

| Run | Berea Core Permeability | Brine, TDS | Temp., ° C. | Injection Sequence |
|---|---|---|---|---|
| 1 | 450 md | 3.5% | 37.8 | $CO_2$ Flood |
| 2 | 550 md | 3.5% | 37.8 | 0.1% Surfactant, then $CO_2$ |
| 3 | 530 md | 7.0% | 37.8 | 0.1% Surfactant, then $CO_2$ |
| 4 | 650 md | 3.5% | 65.6 | 0.1% Surfactant, then $CO_2$ |
| 5 | 520 md | 3.5% | 37.8 | 0.5% Surfactant, then $CO_2$ |

The surfactant in runs 2–5 was a linear $C_{16}$ alkyl phenol disulfonate ($C_{16}$APDS), a surfactant represented by formula (1) above where x=0, y=0, and m=3.

The active surfactant contained 92% disulfonate and 8% monosulfonate. The monosulfonate component had the sulfonate group on the aromatic ring.

The objectives of the tests were to reduce $CO_2$ mobility in a core containing waterflood residual oil and displace the residual oil with the $CO_2$. In all of the core floods in which surfactant was injected, $CO_2$ mobility was reduced by an unsteady-state process involving a two step injection sequence: injection of surfactant solution followed by injection of $CO_2$. In runs 2–5, sufficient surfactant solution was injected so that the effluent surfactant concentration nearly reached the influent surfactant concentration prior to injection of $CO_2$.

The comparative mobility, oil recovery and surfactant retention of each run are summarized in Table 4 below. The comparative mobility is defined as the ratio of the mobility of the gas-aqueous surfactant solution mixture to water mobility at residual oil saturation. At 2.0 pore volumes of $CO_2$ injection, the mobility of the aqueous phase is extremely low, so that for good approximation the comparative mobility is simply the mobility of $CO_2$. A comparative mobility greater than unity indicates the gas will be more mobile than water at residual oil saturation. Generally, for effective mobility control in $CO_2$ floods, the comparative mobility should be below about 1, depending on field conditions. A comparative mobility above about 1 would not be desirable due to instability at the displacement front resulting in fingering, bypassing and low displacement efficiency. However, any reduction of mobility brought about by the injection of surfactant solution of this invention will be beneficial, even if the comparative mobility somewhat exceeds 1.

TABLE 4

| RUN | OIL SATURATION BEFORE SURFACTANT INJECTION | SURFACTANT RETENTION mg/g rock | OIL RECOVERY at 1.2 PV $CO_2$ INJECTION % $S_{or}$ | COMPARATIVE MOBILITY at 2.0 PV $CO_2$ INJECTION |
|---|---|---|---|---|
| 1 | 0.34 | — | 80 | — |
| 2 | 0.44 | 0.18 | 76 | 0.2 |
| 3 | 0.42 | 0.22 | 82 | 0.4 |
| 4 | 0.49 | 0.17 | 85 | 0.3 |
| 5 | 0.49 | 0.20 | 80 | 0.25 |

$CO_2$ Flood (No Surfactant) - Run 1

Run 1 provided a base case for the other runs. The comparative mobility of $CO_2$ characteristically increased to 10 after $CO_2$ breakthrough. The high mobility is related to the low viscosity of $CO_2$, about 0.06 cp at 2000 psi (13,789 kPa) and 100° F. (37.8° C.). The oil recovery was about 80% of waterflood residual oil saturation ($S_{or}$) after 1.2 pore volumes of $CO_2$ were injected. Mobility Control Process In Waterflooded Core Run 2.

An aqueous solution containing 3.5% total dissolved solids and 0.1% $C_{16}$APDS was injected into a waterflooded core. No additional oil was removed from the core during injection of over 3 pore volumes of the surfactant solution. During the subsequent $CO_2$ injection, $CO_2$ mobility was much lower than in Run 1. As shown in FIG. 1, the comparative mobility dropped gradually, leveling off at about 0.2 after 2PV of $CO_2$ injection.

The oil recovery at 1.2 pore volumes of $CO_2$ injected was 76% of waterflood residual oil ($S_{or}$), similar to that obtained in Run 1.

Effect of Salinity, Temperature And Surfactant Concentration Runs 3, 4, And 5

Runs 3, 4, and 5 were similar to Run 2 except that the brine was more saline in Run 3, the temperature was higher in Run 4, and the surfactant concentration was greater in Run 5.

Despite the large changes in conditions, neither surfactant retention, oil recovery, nor comparative mobility was significantly different from the values obtained in Run 2, as shown in Table 4. These results suggest that the performance of a gas mobility control process using the surfactants of this invention is relatively insensitive to reasonable variations in salinity, temperature, and surfactant concentration.

The principle of the invention and the best mode contemplated for applying that principle have been described. It will be apparent to those skilled in the art that various changes may be made to the embodiments described above without departing from the spirit and scope of this invention as defined in the following claims. It is, therefore, to be understood that this invention is not limited to the specific details shown and described.

What is claimed is:

1. A method for recovering oil from a subterranean oil-containing formation comprising injecting into the formation through an injection well in communication therewith a gas selected from the group consisting of carbon dioxide, hydrocarbon gas, inert gas, and steam, and injecting into the formation an aqueous solution containing a surfactant characterized by the formula

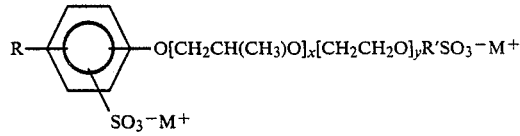

where
R is a linear or branched chain alkyl group with n carbon atoms wherein n ranges from 0 to about 18, except that if the gas is steam n ranges from about 9 to about 30;

x ranges from 0 to about 20 and y ranges from 0 to about 20, provided x+y does not exceed about 20;

R' is a linear or branched chain alkyl group with m carbon atoms wherein m ranges from 0 to 4, except that if the gas is steam m ranges from 1 to 4, with the proviso that the sum of x+y+m is at least one; and
each $M^+$ is a cation.

2. The method of claim 1 wherein the inert gas is air or nitrogen and the hydrocarbon gas is methane, ethane, propane, or natural gas.

3. The method of claim 1 wherein the gas is carbon dioxide, hydrocarbon gas, or inert gas and R is a $C_6$ to $C_{18}$ linear or branched alkyl chain, x is 0, y ranges from 0 to 6, R' is an alkyl group containing two or three carbon atoms and each $M^+$ is an alkali metal ion.

4. The method of claim 1 wherein the gas is carbon dioxide, hydrocarbon gas, or inert gas and R is $C_{16}H_{33}$ linear alkyl chain, x is 0, y is 0, R' is $CH_2CH_2CH_2$ and each $M^+$ is $Na^+$.

5. The method of claim 1 wherein the gas is steam.

6. The method of claim 5 wherein R is a linear or branched $C_{12}$ to $C_{30}$ alkyl chain, x is 0, y ranges from 0 to 6, R' is an alkyl group containing two or three carbon atoms and each $M^+$ is an alkali metal ion.

7. The method of claim 5 wherein R is linear $C_{18}H_{37}$, x is 0, y is 0, R' is $CH_2CH_2CH_2$, and each $M^+$ is $Na^+$.

8. The method of claim 5 wherein R is branched $C_{12}H_{23}$, x is 0, y is 2, R' is $CH_2CH_2$, and each $M^+$ is $Na^+$.

9. The method of claim 1 wherein the subterranean oil-containing formation is penetrated by a well further comprising injecting the aqueous solution containing said surfactant into the formation through said well, injecting gas into the formation through said well, and recovering oil from said well.

10. The method of claim 1 wherein the surfactant concentration in the aqueous solution is 0.01 to 2% by weight.

11. The method of claim 1 wherein the subterranean oil-containing formation is penetrated by at least one injection well and at least one spaced-apart production well further comprising injecting the aqueous solution containing said surfactant into the formation through the injection well, injecting the gas into the formation through the injection well, and recovering oil from the production well.

12. The method of claim 1 wherein said steps of injecting said gas and injecting said aqueous solution containing said surfactant are performed sequentially.

13. The method of claim 1 wherein said steps of injecting said gas and injecting said aqueous solution containing said surfactant are performed simultaneously.

14. A process for recovering oil from a porous oil-containing subterranean formation penetrated by an injection well and a spaced apart production well, which comprises
injecting through said injection well and into said formation an aqueous solution containing a surfactant characterized by the formula

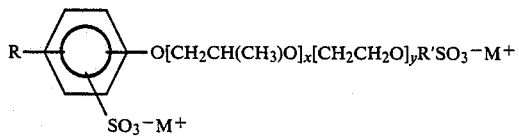

where
R is a linear or branched chain alkyl group with n carbon atoms wherein n ranges from 0 to about 18;
x ranges from 0 to about 20 and y ranges from 0 to about 20, provided x + y does not exceed about 20;
R' is a linear or branched chain alkyl group with m carbon atoms wherein m ranges from 0 to 4, with the proviso that the sum of x + y + m is at least one; and each $M^+$ is a cation.
injecting $CO_2$ through said injection well and into said formation; and
producing oil from the production well.

15. The process of claim 14 wherein the surfactant is characterized by the formula

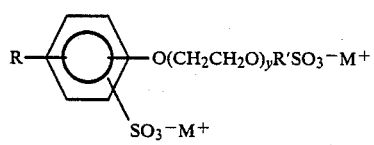

where

R is $C_6$ to $C_{18}$ linear or branched alkyl chain, y ranges from 0 to 6, R' is an alkyl group containing two or three carbon atoms, and each $M^+$ is an alkali metal.

16. The process of claim 14 wherein R is $C_{16}H_{33}$ linear alkyl chain, x is 0, y is 0, R' is $CH_2CH_2CH_2$ and each $M^+$ is $Na^+$.

17. The process of claim 14 wherein R is branched $C_9H_{19}$, x is 0, y is 2, R' is $CH_2CH_2$ and each $M^+$ is $Na^+$.

18. A process for recovering oil from a porous, oil-containing subterranean formation penetrated by an injection well and a spaced apart production well, which comprises
injecting through said injection well and into said formation an aqueous solution containing a surfactant characterized by the formula

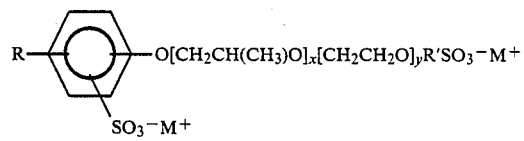

where
R is a linear or branched chain alkyl group with n carbon atoms wherein n ranges from about 9 to about 30;
x ranges from 0 to about 20 and y ranges from 0 to about 20, provided x+y does not exceed about 20;
R' is a linear or branched chain alkyl group with m carbon atoms wherein m ranges from 1 to 4, with the proviso that the sum of x +y +m is at least one; and
each $M^+$ is a cation.
injecting steam through said injection well and into said formation; and
producing oil from the production well.

19. The process of claim 18 wherein R is a linear or branched $C_{12}$ to $C_{30}$ alkyl chain, x is 0, y ranges from 0 to 6, R' is an alkyl group containing two or three carbon atoms and each $M^+$ is an alkali metal ion.

20. The process of claim 18 wherein R is linear $C_{18}H_{37}$, x is 0, y is 0, R' is $CH_2CH_2CH_2$, and each $M^+$ is $Na^+$.

21. A method for reducing gas mobility in a subterranean oil-containing formation having regions of varying permeability comprising injecting into the formation through an injection well in communication therewith a gas selected from the group consisting of carbon dioxide, hydrocarbon gas, inert gas, and steam, and injecting an aqueous solution containing a surfactant characterized by the formula

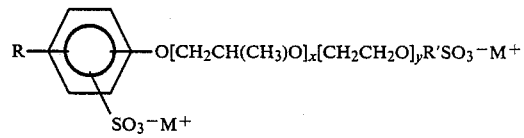

where R is a linear or branched chain alkyl group with n carbon atoms
wherein n ranges from 0 to about 18, except that if the gas
is steam n ranges from about 9 to about 30;
x ranges from 0 to about 20 and y ranges from 0 to about 20, with the proviso that x + y does not exceed about 20;

R' is a linear or branched chain alkyl group with m carbon
atoms wherein m ranges from 0 to 4, except that if the gas
is steam m ranges from 1 to 4, with the proviso that the sum
of x + y + m is at least one; and each M+ is a cation; whereby said gas and said aqueous solution containing said surfactant form a mixture in the formation which significantly reduces gas mobility in the more permeable regions of said formation

* * * * *